US012058496B2

(12) United States Patent
Pontoppidan et al.

(10) Patent No.: US 12,058,496 B2
(45) Date of Patent: Aug. 6, 2024

(54) HEARING SYSTEM AND A METHOD FOR PERSONALIZING A HEARING AID

(71) Applicant: Oticon A/S, Smørum (DK)

(72) Inventors: Niels Henrik Pontoppidan, Smørum (DK); James Michael Harte, Smørum (DK); Hamish Innes-Brown, Smørum (DK); Lorenz Fiedler, Smørum (DK)

(73) Assignee: Oticon A/S, Smørum (DK)

( * ) Notice: Subject to any disclaimer, the term of this patent is extended or adjusted under 35 U.S.C. 154(b) by 171 days.

(21) Appl. No.: 17/883,386

(22) Filed: Aug. 8, 2022

(65) Prior Publication Data

US 2023/0037356 A1 Feb. 9, 2023

(30) Foreign Application Priority Data

Aug. 6, 2021 (EP) .................................... 21190156

(51) Int. Cl.
*H04R 25/00* (2006.01)

(52) U.S. Cl.
CPC ......... *H04R 25/505* (2013.01); *H04R 25/606* (2013.01); *H04R 25/70* (2013.01); *H04R 2225/55* (2013.01)

(58) Field of Classification Search
CPC .... H04R 25/00; H04R 25/505; H04R 25/606; H04R 25/70; H04R 2225/55
See application file for complete search history.

(56) References Cited

U.S. PATENT DOCUMENTS

2012/0183165 A1 7/2012 Foo et al.
2022/0279296 A1* 9/2022 Davis .................. H04R 25/554
2023/0037356 A1* 2/2023 Pontoppidan .......... H04R 25/50
2023/0290333 A1* 9/2023 Tiefenau ............... G10L 13/047
2023/0421974 A1* 12/2023 Luo ...................... H04R 25/552

FOREIGN PATENT DOCUMENTS

CN 111800720 A 10/2020
EP 1708543 A1 10/2006
WO WO 2021/144964 A1 7/2021

* cited by examiner

*Primary Examiner* — Suhan Ni

(74) *Attorney, Agent, or Firm* — Birch, Stewart, Kolasch & Birch, LLP

(57) ABSTRACT

A hearing system includes a processing device, a hearing aid adapted to be worn by a user, and a data logger. The hearing aid includes an input transducer providing an electric input signal representing sound in the environment of the user, and a hearing aid processor executing a processing algorithm in dependence of a specific parameter setting. The data logger stores time segments of said electric input signal, and data representing a corresponding user intent. The processing device comprises a simulation model of the hearing aid. The simulation model is based on a learning algorithm configured to provide a specific parameter setting optimized to the user's needs in dependence of a hearing profile of the user, the logged data, and a cost function. A method of determining a parameter setting for a hearing aid is further disclosed.

20 Claims, 10 Drawing Sheets

HEARING SYSTEM AND A METHOD FOR PERSONALIZING A HEARING AID

TECHNICAL FIELD

The present disclosure relates to hearing aids, in particular to the fitting of a hearing aid to a specific user's hearing impairment, specifically to an increased (and, optionally, continuous) personalization of the fitting procedure. In addition to the term 'a hearing aid', the term 'a hearing instrument' is used in parts of the present disclosure with no intended difference in meaning.

CN111800720A deals with the transmission of audio data to a cloud server providing classification of the sound environment represented by the audio data. Based on the sound scene classification, time and location, a number of predefined settings of the hearing aid are selected.

SUMMARY

The present disclosure describes personalized preference learning with simulation and adaptation, e.g. in a double artificial intelligence (AI) loop. The present disclosure relates to a hearing system and a method relying on an initial (, and thereafter e.g. continued,) interaction between a simulation model of a physical environment comprising a specific hearing aid and the physical environment comprising a particular user wearing the specific hearing aid. The simulation model is mainly focused on determining a personalized parameter setting for one or more audio processing algorithms used in the particular hearing aid to process input signals according to the user's needs (e.g. including to compensate for the user's hearing impairment). A 'personalized parameter setting' is intended to mean a parameter setting that allows the user to benefit optimally from the processing of an audio signal picked up in a given acoustic environment. In other words, a personalized parameter setting may be a parameter setting that provides a compromise between an optimal compensation for the user's hearing impairment (e.g. to provide maximum intelligibility of speech) while considering the user's personal properties and intentions in a current acoustic environment.

Present user preference learning tools infer the personalized preferences from applying AI (e.g. using machine learning (ML) techniques) to the combination of.

- a) objective hearing instrument data (e.g. context as standard estimates of levels and noise as well as classification of sound environments and sound objects),
- b) subjective user ratings (e.g. momentary assessment, text based dialogue with bots, activities (e.g. driving biking, walking, sitting, etc. (may interact with intent)), intents (cf. e.g. FIG. 8) and priorities (cf. e.g. FIG. 4) etc.),
- c) objective operation of the hearing instruments (e.g. program changes, volume changes, etc.), and
- d) objective body responses (e.g. heart rate, EEG, etc.) that e.g. may enable estimation of cognitive load, intent, and fatigue.

Due to safety and regulatory processes, individuals can only change parameter settings within a limited parameter space defined by the programs put in the hearing instrument by the audiologist. Moreover, updating the programs require a scheduled physical or virtual meeting where the audiologist connects to the hearing instruments and adjusts or replace programs.

Thus, the reality is that current preference learning offerings are not capable of exploring the (parameter) settings space of the hearing instruments sufficiently as the users cannot test all the possible combinations of parameter settings (especially as different parameter settings may be relevant in different sound environments, but also even in the same sound environment if for example the intent, capabilities, or activity is different), because the audiologist is not available 24/7. Moreover, even if the audiologist was available 24/7 it is a rather cumbersome process to schedule even a virtual fitting session whilst communicating in a complex environment and even more cumbersome, if the user wishes to experiment with more than a few parameter settings in each sound environment.

In the present context, the term 'a sound scene or a sound environment' is taken to mean a description/characterization of an acoustic scene, e.g.

- A) quiet (relaxing vs listening for sounds in quiet background),
- B) working at office desk (e.g. focusing vs listening for the door or someone returning),
- C) meeting (e.g. a multitude of persons discussing, typically with alternating speakers),
- D) cocktail party (speaking, listening to one, listening to many, or not attending to anything),
- E) discussion with just one other person, (e.g. a one-to-one exchange of information), etc.

In the present context, the term 'intent' is taken to mean a description/characterization of what the wearer of a hearing instrument intends to do in a given sound environment. E.g. at a cocktail party, the wearers' intent can vary, e.g. among other change between 1) speaking to a person next to them, 2) listen for what is happening around them, or 3) attending to the background music.

In the present context, the term 'situation' is taken to mean a combination of an 'intent' and 'a sound scene or a sound environment'. Thus, the above three examples of a user's possible intent in a given sound environment (here, D) 'cocktail party') constitute three different situations even if the sound environment is the same.

In the present context the term 'settings' is taken to refer to 'parameter settings' of a hearing aid program or a processing algorithm. The term 'hearing aid settings' may include a set of 'parameter settings' covering parameter settings for a multitude of hearing aid programs or processing algorithms.

In the present disclosure, the current solutions for obtaining personalized preferences from applying AI and ML to the aforementioned data types are proposed to be extended by adding at least one (e.g. a majority, or all) of four further steps (cf. I, II, III, IV, below) to the current process where manufacturers provide standard settings, audiologists fine-tune standard settings or start from scratch, and hearing instrument wearers report back to audiologist about preferences or where preferences are monitored through data logging (possibly extended with bio-signals, e.g. EEG, temperature, etc.).

- I. A first step may comprise sub-steps
  - Ia: Simulation based optimization of prescribed hearing aid settings with respect to speech intelligibility or other domains like audibility, comfort, spatial clarity, etc., and
  - Ib: Check optimized hearing aid settings on actual hearing aid(s) when worn by the user).

II. A second step may comprise sub-steps

IIa: Optimization of hearing aid settings based on behavioral speech- and non-speech-auditory performance measures, and IIb: Optimization of hearing aid settings based on user preferences.

III. A third step may provide feedback to the simulation model of logged data captured during wear of hearing aid(s) by the user which may spawn a new round of optimization with the simulated sound scenes that statistically match the encountered scenes.

IV. A fourth step may provide optimization of hearing aid settings based on personality traits.

The simulation model may be considered as a digital model of the hearing aid (e.g. the hearing aid worn by the particular user (or a hearing aid that may be a candidate for an alternative hearing aid for the particular user))— thus a digital model replica of a hearing aid that works on sound files. This means that the processing parameters may be EXACTLY the same as those of the hearing aid (or candidate hearing aid) of the particular user (only that their current values may be optimized by the iterative use of the simulation model.

A foreseen benefit of embodiments of a hearing system and method according to the present disclosure is that the end-user (the particular user wearing the hearing aid) or the HCP does not have to search the big parameter space and thus try many small steps themselves, but that the simulation model will find new optimal programs/parameter settings for them.

A Hearing System Comprising a Hearing Aid:

In an aspect of the present application, a hearing system is provided. The hearing system comprises

- a processing device, and
- a hearing aid adapted to be worn by a user, the hearing aid comprising
  - an input transducer configured to provide an electric input signal representing sound in the environment of the user,
  - a hearing aid processor configured to execute at least one processing algorithm configured to modify said electric input signal and providing a processed signal in dependence thereof, said at least one processing algorithm being configurable in dependence of a specific parameter setting, and
- a user interface allowing a user to control functions of the hearing aid and to indicate user intent related to a preferred processing of a current electric input signal;
- a data logger storing time segments of said electric input signal, or estimated parameters that characterizes said electric input signal, and data representing said corresponding user intent while the user is wearing the hearing aid during normal use, and
- a communication interface between said processing device and said hearing aid, the communication interface being configured to allow said processing device and said hearing aid to exchange data between them.

The Processing Device Comprises

- a simulation processor comprising a simulation model of the hearing aid, the simulation model being based on a learning algorithm configured to determine said specific parameter setting for said hearing aid in dependence of
  - a hearing profile of the user,
  - a multitude of time segments of electric input signals representing different sound environments, and
  - a plurality of user intentions each being related to one of said multitude of time segments, said user intentions being related to a preferred processing of said time segments of electric input signals.

The hearing system may further be configured to feed said time segments of said electric input signal and data representing corresponding user intent (or data representative thereof) from said data logger to said simulation model via said communication interface to thereby allow said simulation model to optimize said specific parameter setting with data from said hearing aid and said user.

The simulation model may be configured to optimize the specific parameter setting with data from the hearing aid and the user in an iterative procedure wherein a current parameter setting for the simulation model of the hearing aid is iteratively changed in dependence of a cost function, and wherein the optimized simulation-based hearing aid setting is determined as the parameter setting optimizing the cost function.

The cost function may comprise a speech intelligibility measure, or other auditory perception measure, e.g. listening effort (e.g. cognitive load).

Thereby an improved hearing aid may be provided.

The processing device may form part of or constitute a fitting system. The processing device may be implemented in a computer, e.g. a laptop, or tablet computer. The processing device may be configured to execute a fitting software for adapt parameters of the hearing aid to the user's needs (e.g. managed by a hearing care professional (HCP)). The processing device may be or comprise a portable electronic device comprising a suitable user interface (e.g. a display and a keyboard, e.g. integrated in a touch sensitive display), e.g. a dedicated processing device for the hearing aid. The portable electronic device may be a smartphone (or similar communication device). The user interface of the processing device may comprise a touch sensitive display in communication with an APP configured to be executed on the smartphone. The APP may comprise (or have access to) fitting software for personalizing settings of the hearing aid to the user's needs. The APP may comprise (or have access to) the simulation model.

The simulation model may e.g. be configured to determine a personalized parameter setting for one or more audio processing algorithms used in the particular hearing aid to process input signals according to the user's needs (e.g. including to compensate for the user's hearing impairment).

The user interface of the hearing aid may comprise an APP configured to be executed on a portable electronic device. The user interface of the hearing aid may comprise a touch sensitive display in communication with an APP configured to be executed on the smartphone. The user interface of the hearing aid and the user interface of the processing device may be implemented in the same device, e.g. the processing device.

The hearing system may be configured to provide that at least a part of the functionality of the processing device is accessible (or provided) via a communication network. The communication interface between the processing device and the hearing aid may be implemented as a network interface, e.g. an interface to the Internet. Thereby at least a part of the functionality of the processing device may be accessible (provided) as a cloud service (e.g. to be executed on a remote server). Thereby a larger processing power to the processing device (e.g. to execute the simulation model, and/or to log data) may be provided. Since the update of processing parameters may not be timing critical, the delay of a cloud service may be acceptable. The communication with the cloud service may be performed via an APP of a smartphone, e.g. forming part of the user interface of the hearing aid. The APP may be configured to buffer data from the data logger before being transmitted to the cloud service (see e.g. FIG. 6).

The hearing system may be configured to determine a simulation-based hearing aid setting in dependence of a) the hearing profile of the user, b) the simulation model of the hearing aid, c) a set of recorded sound segments, and to transfer the simulation-based hearing aid setting to said hearing aid via said communication interface, and to apply the simulation-based hearing aid setting to said hearing aid processor for normal use of the hearing aid, at least in an initial learning period.

The set of recorded sound segments may e.g. be mixed according to general environments, e.g. based on prior knowledge and aggregated data logging across different users and/or on individualised environments based on logged data of the user. The hearing system is configured to determine a simulation-based hearing aid setting solely on the hearing profile of the user and model data (e.g. including recorded sound segments) and to use this simulation-based hearing aid setting during an initial (learning) period, where data during normal use of the hearing aid when worn by the particular user for which it is to be personalized can be gathered. Thereby an automized (learning) hearing system may be provided.

The simulation model may comprise a model of acoustic scenes. The model of acoustic scenes may be configured to generate a variety of acoustic scenes from different time segments of electric input signals, where e.g. (relatively) clean target signals (e.g. speech or music or other sound sources) are mixed with different noise types (and levels).

The learning algorithm may be configured to determine said specific parameter setting for said hearing aid in dependence of a variety of different acoustic scenes created by mixing said time segments of the electric input signals in accordance with said model of acoustic scenes. The acoustic scenes may e.g. include general scenes that span standardized acoustic scenes and/or individual (personalized) acoustic scenes according to the logged data from the hearing aid.

The hearing aid system may comprise at least one detector or sensor for detecting a current property of the user or of the environment around the user. The at least one detector or sensor may comprise a movement sensor, e.g. an accelerometer to indicate a current movement of the user. The at least one detector or sensor may comprise a temperature sensor to indicate a current temperature of the user and/or of the environment around the user. The at least one detector or sensor may comprise sensor to bio-signal from the user's body, e.g. an EEG-signal, e.g. for extracting a user's current intent, and/or estimating a user's current mental or cognitive load.

The hearing aid system may be configured to provide that current data from the at least one detector or sensor are stored in the datalogger and associated with other current data stored in the data logger. The sensor/detector data may e.g. be stored together with the user's intent or classification of the current acoustic environment, or with data representing the current acoustic environment, e.g. a time segment of an electric input signal (e.g. a microphone signal), or a signal derived therefrom.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method of Determining a Hearing Aid Setting:

In an aspect, a method of determining hearing aid setting comprising a parameter setting, or a set of parameter settings, for a specific hearing aid of a particular user, the method comprising S1. Providing a simulation-based hearing aid setting in dependence of a) a hearing profile of the user,
b) a (digital) simulation model of the hearing aid, the simulation model comprising configurable processing parameters of the hearing aid,
c) a set of recorded sound segments,
d) determining said hearing aid setting by optimizing said processing parameters in an iterative procedure in dependence of said recorded sound segments, said hearing profile, said simulation model, and a cost function.

S2. Transferring the simulation-based hearing aid setting to an actual version of said specific hearing aid.

S3. Using the simulation-based hearing aid setting on said actual hearing aid, when worn by the user.

S4. Logging data from the actual hearing aid, said data including data representing encountered sound environments and the user's classification thereof.

S5. Transferring the logged data to the simulation model.

S6. Optimizing said simulation-based hearing aid setting determined in step S1 based on said logged data, optionally mixed with said recorded sound segments, S7. Transferring the optimized simulation-based hearing aid setting to the actual version of said specific hearing aid is furthermore provided by the present application.

It is intended that some or all of the structural features of the system and device described above, in the 'detailed description of embodiments' or in the claims can be combined with embodiments of the method, when appropriately substituted by a corresponding process and vice versa. Embodiments of the method have the same advantages as the corresponding system and device.

The method may comprise that steps S4-S7 are repeated (e.g. continually, e.g. with a specific frequency or triggered by specific events, or manually initiated (e.g. by the user or by a HCP).

The method may comprise that step S4 further comprises logging data from one or more of the activities of the user, the intent of the user, and the priorities of the user (in the given acoustic environment), see e.g. FIG. 7B.

In an aspect, a method of determining a hearing aid setting comprising a parameter setting, or set of parameter settings, for a specific hearing aid of a particular user is provided by the present disclosure. The method comprises:

S1. Providing a multitude of simulated acoustic scenes in dependence of meta-data of the hearing aid characterizing sound environments encountered by the user (e.g. provided by hearing aid data logging) mixed with recorded sounds from a database;

S2. Providing hearing aid processed simulated acoustic scenes according to a current set of parameter settings based on a digital simulation model of the user's hearing aid and said multitude of simulated acoustic scenes (from S1);

S3. Providing hearing loss-deteriorated hearing aid processed simulated acoustic scenes based on a digital simulation of the direct impact on the hearing aid processed simulated acoustic scenes (from S2) due to the user's hearing loss based on the hearing profile, e.g. a deterioration due to limited audibility, limited spectral resolution, etc.;

S4. Providing a resulting listening measure of the user's perception of said simulated acoustic scenes based on a hearing model (e.g. based on AI) that simulates the perception of the user of said hearing loss-deteriorated hearing aid processed simulated acoustic scenes (from S3), the resulting listening measure being e.g. in the form 1) a speech intelligibility measure (e.g. based on automatic speech recognizers, or metrics like E-STOI), 2) listening effort, or 3) other comfort or sound quality based established metrics;

S5. Optimizing the resulting listening measure (from S4) by changing the current set of parameter settings (from S2) under a cost function constraint, wherein the cost function is the resulting listening measure, e.g. maximizing a speech intelligibility measure or a comfort measure, or minimization a listening effort measure;

S6. Repetition of S2-S6 until convergence (e.g. according to a criterion related to the cost function, e.g. a threshold value), or a set performance, is reached S7. Transferring the optimized simulation-based hearing aid setting(s) to the actual version of said specific hearing aid S8. Using the simulation-based hearing aid setting on said actual hearing aid, when worn by the user.

S9. Logging data from the actual hearing aid, said data including data representing encountered sound environments and the user's classification thereof S10. Transferring the logged data to the simulation model.

S11. Optimizing said simulation-based hearing aid setting based on said logged data following steps S1-S7.

An embodiment of the method is illustrated in FIG. 1B.

Step S1 can be influenced by logging data obtained with the same hearing aid or with another hearing aid without it having been part of the loop.

Meta-data of the hearing aid may e.g. be data derived by the hearing aid from input sound to the hearing aid. Meta-data of the hearing aid may e.g. comprise input signal levels (e.g. provided by a level detector connected to an electric input signal provided by a microphone (or to a processed version thereof). Meta-data of the hearing aid may e.g. comprise quality measures of an input signal to the hearing aid, e.g. a signal to noise ratio (SNR) of an electric input signal provided by a microphone (or of a processed version thereof), e.g. estimates of the persons own voice activity, internal and proprietary processing parameters from the hearing aid algorithms, estimates of effort, estimates of intelligibility, estimates of head and body movements, actual recordings of the microphone signal, sound scene classifications. The meta-data of a hearing aid may e.g. be logged continuously, or taken at certain occasions, e.g. triggered by a specific event or criterion (e.g. exceeding a threshold), or be user-triggered.

The method comprises two loops: An inner loop comprising steps S2-S6, and an outer loop comprising steps S1-S11.

The simulation model of the hearing aid may represent the user's hearing aid or another hearing aid, e.g. a hearing aid style that may be considered as a useful alternative for the user.

The simulation model is a digital simulation of a hearing aid that processes sound represented in digital format with a (current, but configurable) set of hearing aid settings. It takes sounds, either direct recordings from the users hearing aid, or sounds generated by mixing sounds from the database according to the users Meta-data and settings, as inputs and provides sound as an output.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An App:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device (e.g. the processing device) allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
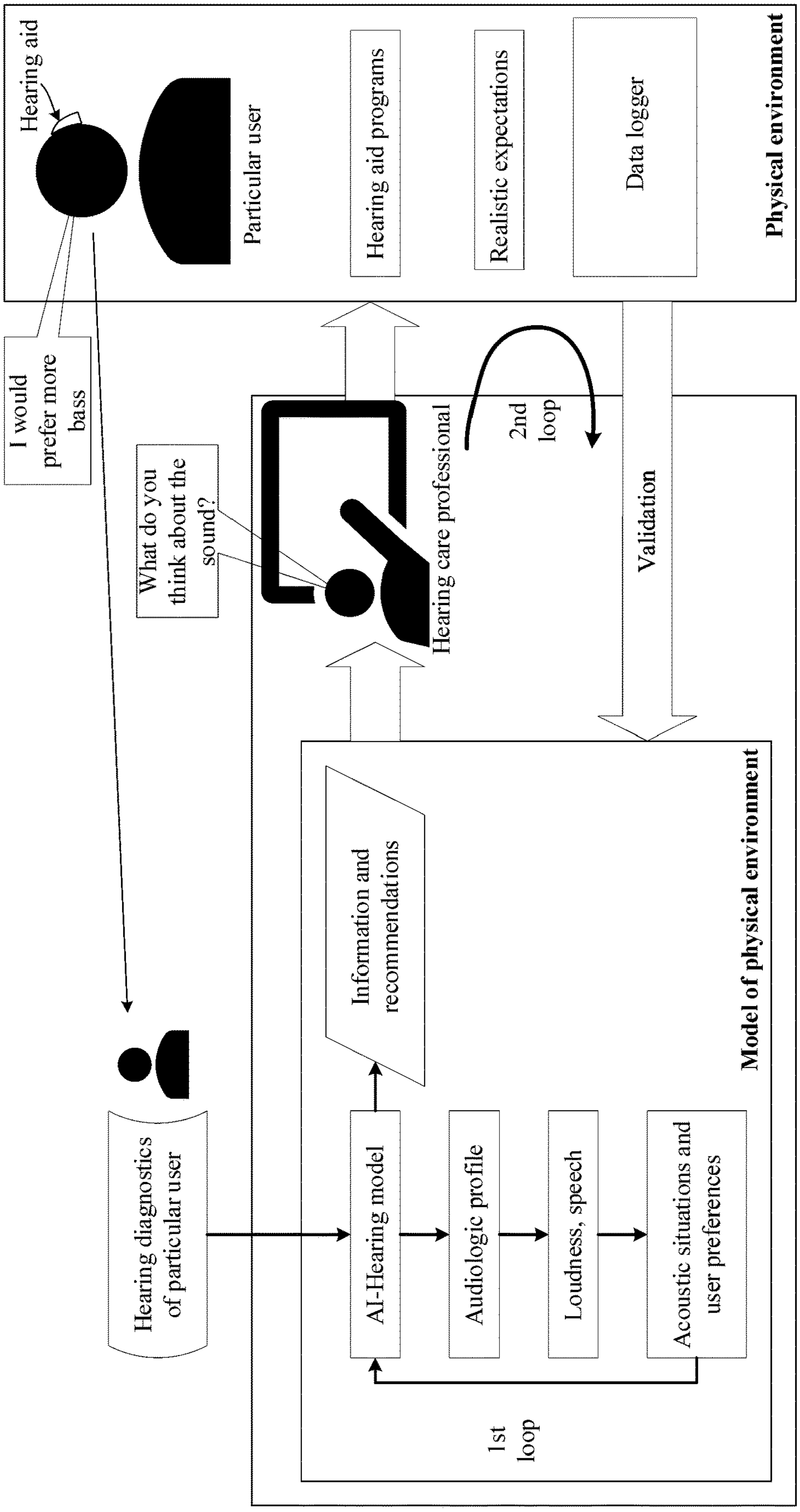
FIG. 1A shows a first embodiment of a hearing system and a method according to the present disclosure.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to personalizing processing of a hearing aid to its current user.

In the present disclosure, the current solutions for obtaining personalized preferences from applying AI and ML to the aforementioned data types are proposed to be extended by adding at least one (e.g. a majority, or all) of four further steps (cf. I, II, III, IV, below) to the current process where manufacturers provide standard settings, audiologists fine-tune standard settings or start from scratch, and hearing instrument wearers report back to audiologist about preferences or where preferences are monitored through data logging (possibly extended with bio-signals, e.g. EEG, temperature, etc.).

I. A First Step May Comprise Determining and Verifying a Simulation-Based Hearing Aid Setting:

Ia: Simulation Based Optimization of Prescribed Hearing Aid Settings with Respect to Speech Intelligibility or Other Domains Like Audibility, Comfort, Spatial Clarity, Etc.

Consider a hearing loss and outcome simulation engine (one particular embodiment is denoted FADE (described in [Schädler et al.; 2018], [Schadler et al.; 2016]), which handles hearing loss simulation, processing simulation, and estimation of intelligibility (involving automatic speech recognition), which is used as the example embodiment hereafter). The simulation engine FADE takes a set of recorded and transcribed sentences (e.g. both audio and text is available), a set of background noises (as audio), parameters describing an individual's hearing loss, an instance of a hearing aid (either physical instance or a digital equivalent) fitted to the individual hearing loss. The process starts by processing sounds from a database with prescribed settings and passing this mixture through the hearing loss and hearing outcome simulation, where FADE predicts the speech understanding performance. Analyzing the impact on the performance as a function of the hearing aid settings, a preference recommender learning tool then optimizes the settings of the hearing aid instance so that the automatic speech recognizer gets the best understanding (as predicted by FADE) for a particular hearing loss.

Ib: Check Optimized Hearing Aid Settings on Actual Hearing Aid(s) when Worn by the User).

The optimized settings may be subject to approval by the audiologist or directly. The optimized settings from the step Ia are then transferred to actual hearing aids worn by the individuals (e.g. a particular user). And here the traditional analytical method that combines context and ratings is used to confirm or reject whether the optimized settings are indeed optimal taking usage patterns into account.

II. A Second Step May Comprise Optimization of Hearing Aid Settings Based on Data from Actual Use.

IIa: Optimization of Hearing Aid Settings Based on Behavioral Speech- and Non-Speech-Auditory Performance Measures.

A new range of optimization metrics independent of the automatic speech recognizer used in FADE is introduced. These optimization metrics combine behavioral speech and non-speech auditory performance measures, e.g. detection thresholds for spectro-temporal modulation (STM) (like Audible Contrast Threshold (ACT)) or spectral contrasts (ripples or frequency resolution tests), transmission of auditory salient cues (interaural level, time, and phase cues, etc.), or correlated psychophysiological measures, such as EEG or objective measures of listening effort and sound quality (cf. e.g. validation step 2A in FIG. 2).

IIb: Optimization of Hearing Aid Settings Based on User Preferences.

We also introduce a new set of scales and criteria with which the individual hearing aid user can choose to report their preferences in a given situation. In one situation, e.g., it is not the perceived speech recognition that the hearing aid user decides is of importance; instead the user reports on clarity of the sound scene, and this metric may hereafter be given more weight in the simulation of the present sound scene and possibly in similar scenes, cf. e.g. validation step 2 (2A, 2B) in FIG. 2.

III. A Third Step May Provide Feedback to the Simulation Model of Logged Data Captured During Wear of Hearing Aid(s) by the User which May Spawn a New Round of Optimization with the Simulated Sound Scenes that Statistically Match the Encountered Scenes.

Figure 2:
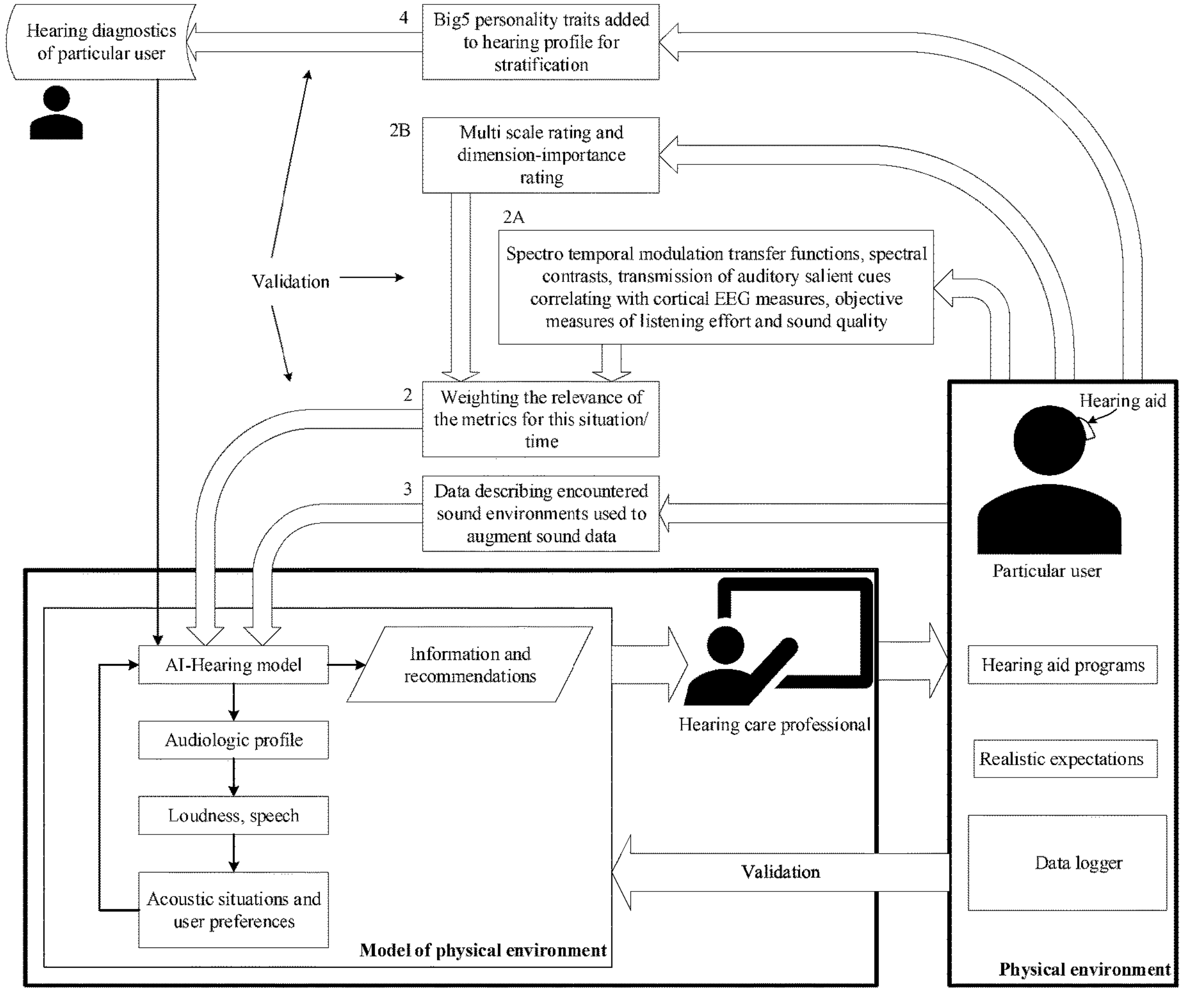
FIG. 2 shows a second embodiment of a hearing system according to the present disclosure.

A third step may comprise that data logged from hearing aids that describe sound scenes in level, SNR, etc., are used to augment the scenes, which are used for the simulation and optimization of hearing aid settings, cf. e.g. validation step 3 in FIG. 2. This may also be extended with more descriptive classifications of sounds and sound scenes beyond quiet, speech, speech-in-noise, and noise. Hereby a set of standardized audio recordings of speech and other sounds can be remixed together with the range of parameters experienced by each individual and also beyond the scenes experienced by the individual to create simulation environments that prepare settings for unmet scenes with significant and sufficient generalizability over just the sound scenes the individual encounters and the sound scenes the individual could record and submit.

IV. A Third Step May Provide Optimization of Hearing Aid Settings Based on Personality Traits.

A fourth step may comprise that the simulation model estimates personality traits of each individual from questionnaires or indirectly from data and uses this in the optimization of hearing aid settings. The estimated personality traits may further be used during testing and validating the proposed settings. Recently an interesting finding how especially neuroticism and extraversion among the Big5 (here the 5 most probable of the 5 most frequently occurring) personality traits impact the acceptance of noise, performance in noise, and perceived performance in noise (cf. e.g. [Wöstmann et al.; 2021], and regarding the 'Big Five personality traits', see e.g. Wikipedia at https://en.wikipedia.org/wiki/Big_Fivepersonalitytraits), cf. e.g. validation step 4 in FIG. 2.

Figure 1B:
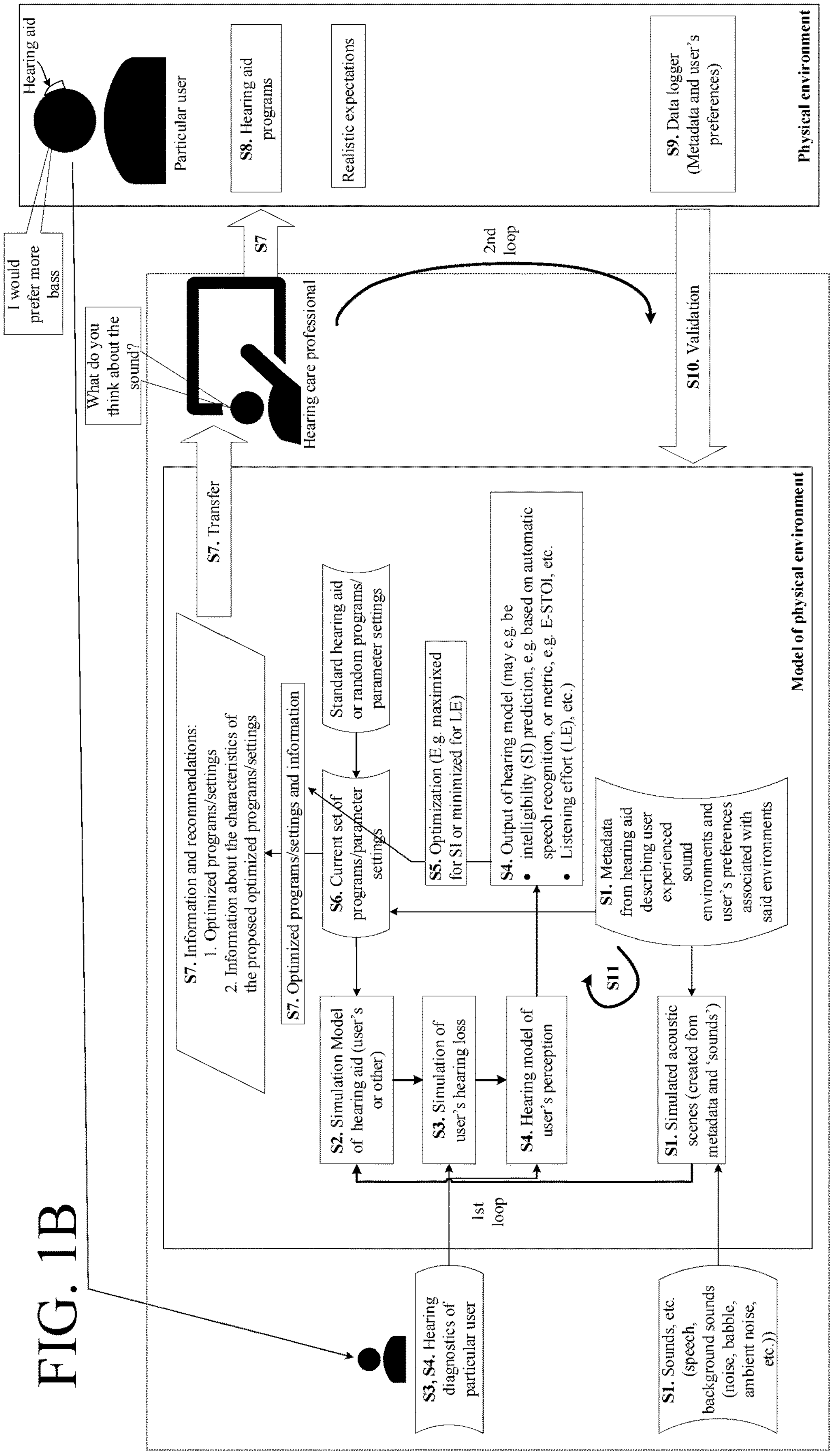
FIG. 1B shows a more detailed version of the first embodiment of a hearing system and a method according to the present disclosure.

FIGS. 1A and 1B shows first and second embodiments, respectively, of a hearing system and a method according to the present disclosure. The hearing system comprises a physical environment comprising a specific hearing aid located at an ear of particular user. It further comprises model of the physical environment (e.g. implemented in software executed on a processing device, e.g. a personal computer or a server accessible via a network). A hearing care professional (HCP) may act as an intermediate link between the model of the physical environment and the physical environment. In other embodiments, the HCP may be absent.

The general function of the method and hearing system illustrated in FIGS. 1A and 1B may be outlined as follows.

An aim of the hearing system and method is to determine a personalized parameter setting for one or more audio processing algorithms used in the particular hearing aid to process input signals according to the user's needs (e.g. including to compensate for the user's hearing impairment). A 'personalized parameter setting' is intended to mean a parameter setting that allows the user to benefit optimally from the processing of an audio signal picked up in a given acoustic environment. In other words, a personalized parameter setting may be a parameter setting that provides a compromise between an optimal compensation for the user's hearing impairment (e.g. to provide maximum intelligibility of speech) while considering the user's personal properties and intentions in a current acoustic environment.

FIG. 1A, 1B illustrates a personalized preference learning with simulation (in the model of the physical environment part of FIG. 1A, 1B) and adaptation (in the physical environment part of FIG. 1A, 1B), e.g. in a double artificial intelligence (AI) loop. FIG. 1A, 1B illustrates an initial, and thereafter possibly continued, interaction between a simulation model of the physical environment and the physical environment. The physical environment comprises a specific hearing aid worn by a particular user. The model of the physical environment comprises a simulation of the impact of the hearing profile of the user on the sound signals provided by the hearing aid (block 'Audiologic profile' in FIG. 1A, and 'Simulation of user's hearing loss' in FIG. 1B) based on hearing data of the particular user, cf. block 'Hearing diagnostics of particular user' in FIG. 1A, 1B). The model of the physical environment further comprises an (e.g. AI-based) simulation model of the hearing aid (block 'AI-Hearing model' in FIG. 1A, and 'Simulation Model of hearing aid' in FIG. 1B). The model of the physical environment further comprises a set of recorded sound segments (blocks 'Loudness, speech' and 'Acoustic situations and user preferences' in FIG. 1A, and blocks 'Sounds, etc.' and 'Simulated acoustic scenes' in FIG. 1B). The simulation model provides as an output a recommended hearing aid setting for the specific hearing aid (and the particular user) (block 'Information and recommendations' in FIG. 1A, 1B). In a first loop, the recommended hearing aid setting is solely based on the simulation model (using a hearing profile of the specific user and (previously) generated hearing aid input signals corresponding to a variety of acoustic environments (signal and noise levels, noise types, user preferences, etc.), cf. arrow denoted '1$^{st}$ loop' in FIG. 1A, 1B symbolizing at least one (but typically a multitude of runs) through the functional blocks of the model ('AI-hearing model'→ 'Audiologic profile'→ 'Loudness, speech'→ 'Acoustic situations and user preferences'→ 'AI-hearing model' in FIG. 1A and 'S1. Simulated acoustic scenes'→ 'S2. Simulation model of hearing aid' (based on 'Current set of programs/parameter settings')→ 'S3. Simulation of user's hearing loss'→ S4. Hearing model of user's perception'→ S5. 'Optimization'→ S6. Changing 'Current set of programs/parameter settings'→ S2, etc. in FIG. 1B). The estimation of the specific parameter setting may be subject to a loss function (or cost function), e.g. weighting speech intelligibility and user intent. The specific hearing aid may be of any kind or style, e.g. adapted to be worn by a user at and/or in an ear. The hearing aid may comprise an input transducer configured to provide an electric input signal representing sound in the environment of the user. The hearing aid may further comprise a hearing aid processor configured to execute at least one processing algorithm configured to modify the electric input signal and providing a processed signal in dependence thereof (cf. block 'Hearing aid programs' in FIG. 1A, 1B). The at least one processing algorithm may be configurable in dependence of a specific parameter setting. The at least one processing algorithm may e.g. comprise a noise reduction algorithm, a directionality algorithm, an algorithm for compensating for a hearing impairment of the particular user (e.g. denoted a compressive amplification algorithm), a feedback control algorithm, a frequency transposition algorithm, etc. The hearing aid may comprise one of more hearing aid programs optimized for different situations, e.g. speech in noise, music, etc. A hearing aid program may be defined by a specific combination of processing algorithms wherein parameter settings of the processing algorithms are optimized to the specific purpose of the program. The hearing aid comprises or has access to a data logger (cf. block 'Data logger' in FIG. 1A, 1B) for storing time segments of the electric input signal or signals of the hearing aid (e.g. one or more microphone signals, or a signal or signals derived therefrom), or, alternatively or additionally, estimated parameters that characterize the electric input signal(s), e.g. so-called meta-data. The data logger may further be configured to store data representing a corresponding user intent associated med a given electric input signal or signals (and thus a given acoustic environment), while the user is wearing the hearing aid during normal use. The data representing user intent (and possibly further information, e.g. a classification of the acoustic environment represented by the stored electric input signals (or parameters extracted therefrom, cf. block 'realistic expectations' in FIG. 1A, 1B) may be entered in the datalogger via an appropriate user interface, e.g. via an APP of a portable processing device (e.g. a smartphone, cf. e.g. FIG. 5, 6), e.g. via touch screen (by selecting among predefined options (cf. e.g. FIG. 3, 8) or giving in new options via a keyboard), or using a voice interface.

The embodiment of a hearing system shown in FIG. 1B differs in particular from the embodiment of FIG. 1A in its level of detail, as described in the following. The hearing system according to the present disclosure uses meta-data from user experienced sound environments to simulate the user's listening experience (by mixing other sounds with meta-data and user experiences provided by a data logger of the user's hearing aid), cf. box 'S1. Simulated acoustic scenes in FIG. 1B'. The thus generated sound segments representing a simulated acoustic scene may be forwarded (e.g. digitally as a sound file) to the simulation model of the hearing aid (e.g. the hearing aid worn by the particular user), cf. box 'S2. Simulation model of hearing aid' in FIG. 1B. The output of the simulation model may be forwarded to a simulation model of the user's hearing loss sound perception ability, cf. box 'S3. Simulation of user's hearing loss' in FIG. 1B. For each sound segment the simulation is repeated using different candidate parameter settings until an optimal (proposal for) hearing aid parameter settings (for the selected sound segments and the given user (and user preferences)) is arrived at. For a given sound segment the simulation result is forwarded to a hearing model of the user's perception (cf. box 'S4. Hearing model of user's perception' in FIG. 1B). The output of the hearing model of the user's perception (a perception measure) may e.g. be a prediction of the user's speech intelligibility (SI) of a given sound segment, e.g. based on automatic speech recognition (ASR), or a perception metric, e.g. the Speech Intelligibility Index (cf. e.g. [ANSI S3.5; 19951]), STOI or E-STOI (cf. e.g. [Jensen & Taal; 2016]), etc., or a prediction of the user's listening effort (LE), or other measures reflecting the user's ability to perceive the sound segment in question (cf. e.g. box 'S4. Output of hearing model'). The optimized parameter settings may e.g. be arrived at by adaptively changing the parameter settings of the hearing aid model using a cost function, e.g. based on maximizing speech intelligibility (SI) or minimizing listening effort (LE) (see boxes S5 and S6, 'S5. Optimization' illustrating an adaptive process changing the 'S6. Current set of programs/parameter settings' in dependence of a cost function). The optimized parameters may be found using standard, iterative, steepest-descent (or steepest-ascent) methods, and minimization (or maximization) the cost function. When the relevant sound segments have been evaluated in a joint optimization process, the set of optimized parameter settings are the parameter settings that maximize (or minimize) the chosen cost function (e.g. maximize SI, or minimize LE). When the optimized parameter settings have been determined, they are stored for automatic or manual transfer to the hearing aid (cf. box 'S7. Information and recommendations'). The information and recommendations may comprise two parts: 1. Optimized programs/settings, and 2. Information about the characteristics of the proposed optimized programs/parameter settings (e.g. communicated by a Hearing Care Professional (HCP) to the particular user in a physical or remote fitting session, cf. arrows 'S7. Transfer' in FIG. 1B). The method steps hosted by the user's hearing aid may be identical to those of FIG. 1A, as described in the following.

The hearing system comprises a communication interface between the processing device (hosting the model of the physical environment) and the hearing aid of the particular user to allow the processing device and the hearing aid to exchange data between them (cf. arrows 'S7') from 'Model of physical environment' (processing device) to 'Physical environment' (hearing aid, or an intermediate device in communication with the hearing aid)).

A HCP may be involved in the transfer of the model based hearing aid setting to the actual hearing aid, e.g. in a fitting session (cf. 'Hearing care professional', and callouts indicating an exchange of information between the HCP and the user of the hearing aid, cf. 'Particular user' in FIG. 1A, 1B). The exchange of information may be in the form of oral exchange, written exchange (e.g. questionnaires) or a combination. The exchange of information may take place in a session where the HCP and the user are in the same room, or may be based on a 'remote session' conducted via communication network or other channel.

When the simulation-based hearing aid setting has been transferred to the actual version of said specific hearing aid and applied to the appropriate processing algorithms, the user wears the hearing aid in a learning period where data are logged. The logged data may e.g. include data representing encountered sound environments (e.g. time segments of an electric input signal, or signals or parameters derived therefrom, e.g. as meta-data) and the user's classification thereof and/or the user's intent when present in given sound environment. After a period of time (or continuously, or according to a predefined scheme, or at a session with a HCP), data are transferred from the data logger to the simulation model via the communication interface (cf. arrow 'Validation' in FIG. 1A, 1B). Based on the transferred data from the user's personal experience while wearing the hearing aid(s) a $2^{nd}$ loop is executed by the simulation model where the logged data are used instead of or as a supplement to the predefined (general) data representing acoustic environments, user intent, etc. Thereby an optimized hearing aid setting is provided. The optimized hearing aid setting is transferred to the specific hearing aid and applied to the the appropriate processing algorithms. Thereby an optimized (personalized) hearing aid is provided.

The $2^{nd}$ loop can be repeated continuously or with a predefined frequency, or triggered by specific events (e.g. power-up, data logger full, consultation with HCP (e.g. initiated by HCP), initiated by the user via a user interface, etc.).

FIG. 2 shows a second embodiment of a hearing system according to the present disclosure. FIG. 2 schematically illustrates an implementation spanning data collection and internal cloud that carries out the AI based optimization that finds the best settings for the given individual in standard situations and situations adapted to simulate the individual sound scenes.

FIG. 2 is an example of a further specified hearing system compared to the embodiments of FIG. 1A, 1B, specifically regarding the logged data of the hearing aid and the transfer thereof to the simulation model ('Validation'). The difference of the embodiment of FIG. 2 compared to FIG. 1A, 1B is illustrated by the arrows and associated blocks denoted 2, 2A, 2B, 3, 4. The exemplary contents of the blocks is readable from FIG. 2 and mentioned in the four 'further steps' (I, II, III, IV) listing possible distinctions of the present disclosure over the prior art (cf. above). The information in box 4, denoted 'Big5 personality traits added to hearing profile for stratification' is fed to the 'Hearing diagnostics of particular user' to provide a supplement to the possible more hearing loss dominated data of the user. The information in boxes 2 (2A, 2B) and 3 are all fed to the AI-hearing model, representing exemplary data of the acoustic environments encountered by the user when wearing the hearing aid, and the user's reaction to these environments.

Figure 3:
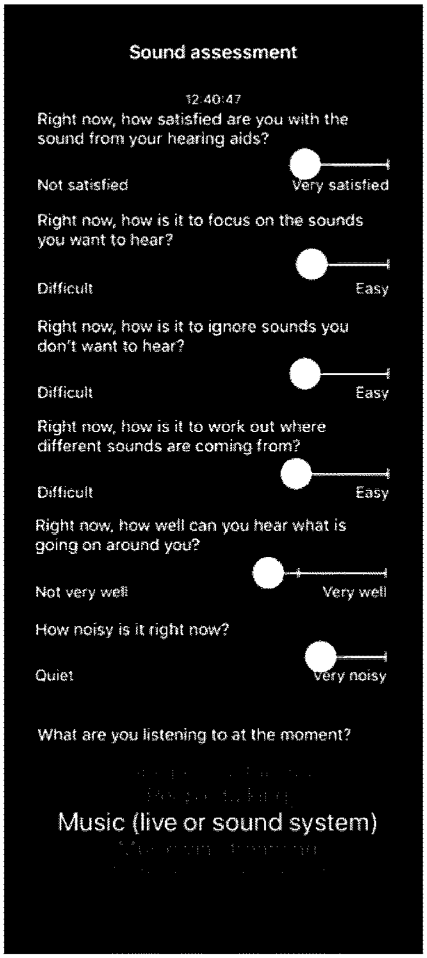
FIG. 3 shows an example of a rating-interface for a user's rating of a current sound environment.

FIG. 3 shows an example of a rating-interface for a user's rating of a current sound environment. The 'Sound assessment' rating interface corresponds to a questionnaire allowing a user to indicate a rating based on (here six) predefined questions, like the first one 'Right now, how satisfied are you with the sound from your hearing aids'. The user has the option for each question of (continuously) dragging a white dot over a horizontal scale from a negative to a positive statement (e.g. from 'Not satisfied' to 'Very satisfied' (question 1), or from 'Difficult' to 'Easy' (question 2 (regarding ease of focus on target signal), 3 (regarding ease of ignoring unwanted sounds), 4 (regarding ease of identifying sound direction), or from Not very well' to 'very well' (question 5 (regarding ease of sending acoustic environment), or from 'Quiet' to 'Noisy' (question 6, regarding degree of noise)). In other words, an opinion from '0' (negative) to '1' (positive) can be indicated and used in an overall rating, e.g. by making an average of the ratings of the questions (e.g. a weighted average, if some questions are considered more important than others). These data can then be logged and transferred to the simulation model (see arrow 'validation' in FIG. 1A, 1B and box '2B' ('Multiscale rating . . . ') in FIG. 2).

Figure 4:
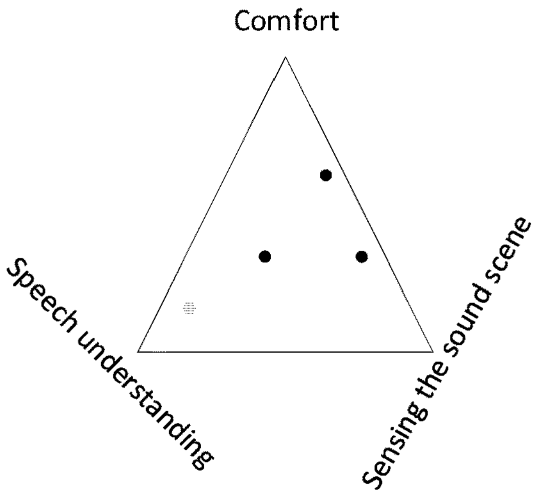
FIG. 4 shows an example of an interface configured to capture the most important dimension of a user's rating of a current sound environment, e.g. for graphically illustrating the data of FIG. 3, dots being representative of specific weightings.

These data are schematically illustrated in FIG. 4. FIG. 4 shows an example of an interface configured to capture the most important dimension of a user's rating of a current sound environment, e.g. for graphically illustrating the data of FIG. 3, dots being representative of specific weightings. Here the weight of each dimension is inverse-proportional to the distance to the corner. Thus, putting the red dot in the middle all dimensions are equally important. Each dot in FIG. 4 refers to a different rating. Such quantification of more complicated 'opinion' data may be advantageous in a simulation model environment.

Current Process Example

User Alice schedules and appointment for hearing aid fitting with audiologist Bob, and have her hearing measured and characterized by standard procedures like audiograms, questionnaires, specific speech tests, and in-clinic simulation of scenes and settings.

Alice then leaves Bob having one (or a few) distinct hearing aid settings on her hearing instruments and starts using the hearing instruments in her everyday situations.

After a while Alice returns to Bob for a follow-up session where they talk about the situations that Alice has encountered both the good and less good experiences. Based on this dialogue, and possibly assisted by looking at usage data (duration, sound environments, and relative use of the different settings) as well as experience and insights of Bob, Bob then adjust the settings in the hearing instrument so that the palette of settings better matches what Bob believes will benefit Alice. However, Bob is not aware of an update to the noise reduction and is therefore not capable of utilizing this to increase the benefits of the hearing instruments.

Alice now returns to using her hearing instruments in her everyday situations.

After another while Alice returns to Bob again and goes through the same process as last time. Still, Bob is not aware of an update to the noise reduction and is therefore not capable of utilizing this to the full extent.

Process Example According to the Present Disclosure

User Alice schedules and appointment for hearing aid fitting with audiologist Bob, and have her hearing measured and characterized by standard procedures like audiograms, questionnaires, specific speech tests, and in-clinic simulation of scenes and settings.

Alice then leaves Bob having one (or a few) distinct hearing aid settings on her hearing instruments and starts using the hearing instruments in her everyday situations.

While Alice uses the hearing instruments, the hearing instruments and the APP (e.g. implemented on a smartphone or other appropriate processing comprising display and data entry functionality) collects data about the sound environments and possibly intents of Alice in those situations (cf. 'Data logger' in FIG. 1A, 1B, etc.). The APP also prompts Alice to state what she parameter she uses to optimize for in the different sound environments and situations.

Meanwhile, the cloud service simulates sound environments and situations with the data that describes her hearing, her sound environments, intents, and priorities collected with the smartphone and the hearing instruments. The simulation model may be implemented as one part of the cloud service where logged data are used as inputs to the model related to the situations to be simulated. Another part of the cloud service may be the analysis of the metrics to learn the preference for the tested settings (cf. e.g. validation step 2 (2A, 2B) in FIG. 2). This leads to an individualized proposal of settings that optimizes the hearing instrument settings with Alice's priorities for Alice's sound environment and hearing capabilities.

When Alice returns to Bob for a follow-up session they talk about the situations that Alice has encountered—both the good and less good experiences. Based on this dialogue Bob reviews the proposals of optimal settings and selects the ones which in his experience together with the description of the situations fit Alice's needs and situations the best. Since the devices were given to Alice, the noise reduction was updated and the optimization suggested a setting that utilizes this. The hearing instrument(s) may e.g. be (firmware-) updated during use, e.g. when recharged. The hearing instrument(s) may e.g. be firmware updated out of this cycle (e.g. at a (physical or remote) consultation with a hearing care professional). The hearing instrument(s) may not need to have firmware updates if a "new" feature is just launched by enabling a feature in the fitting software.

When Alice returns to Bob for another follow-up session, they can also see which of the individual settings that Alice rated as good and which ones she has used either a lot or for specific situations.

Further Examples

Embodiments of the present disclosure may include various combinations of the following features:

1) The cloud service may simulate sound scenes and optimize hearing instrument settings that provide the best outcome for the individual user given their hearing characteristics, sound environments, preferences, and priorities. The sound environments, preferences, and priorities are collected from features 3) and 4).
2) A fitting interface may enable the audiologist to select among the proposed optimized hearing instrument settings and thereafter store these settings on the individual user's hearing aid.
3) In a learning period and/or during normal use, the smartphone APP may collect user ratings (how good is this setting, how important is comfort vs speech in noise understanding vs. sensing the scene) and buffer data from feature 4) for use in feature 1). Moreover, the smartphone can add missing data types, if not available from the hearing instrument, e.g. movement data (e.g. acceleration data) and/or location data (e.g. GPS coordinates). The smartphone APP may also collect intents of the user in different sound environments. This may e.g. be done during a learning period and/or continuously during normal use.
4) The hearing instrument may process the incoming audio according to the currently selected settings. The hearing instrument may also provide data describing the sound environment for feature 1).

Figure 5:
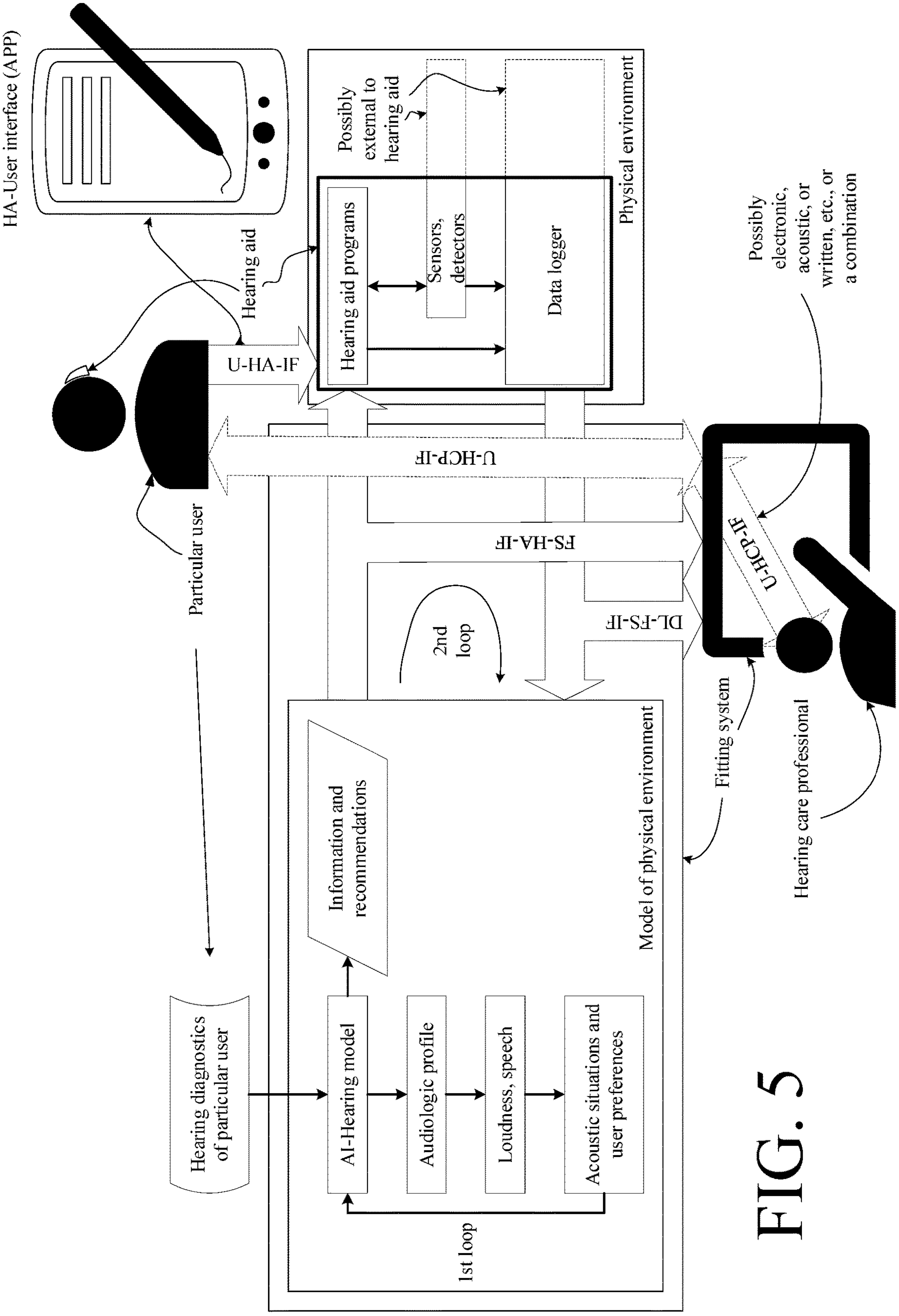
FIG. 5 shows a third embodiment of a hearing system according to the present disclosure.

FIG. 5 shows a third embodiment of a hearing system according to the present disclosure. The embodiment of a hearing system shown in FIG. 5 is similar to the embodiment of FIG. 1A, 1B. The difference of the embodiment of FIG. 5 compared to FIG. 1A, 1B is illustrated by the arrows showing 'interfaces' of the hearing system. Further the hearing aid of the physical environment is specifically indicated. The hearing aid comprises blocks 'hearing aid programs', 'Sensors/detectors' and 'Data logger'. As indicated in FIG. 5, some of the functionality of the hearing aid may be located in another device, e.g. a separate processing device in communication with the hearing aid (which may comprise only an ear piece functioning as capture of acoustic signals and presentation of a resulting (processed) signal to the user. Such separate parts may include some or all processing, some or all sensors/detectors and some or all of the data logging.

The hearing care professional (HCP) has access to a fitting system comprising the model of the physical environment including the AI-simulation model. A number of interfaces between the fitting system and the hearing aid and an associated processing device serving the hearing aid, e.g. a smartphone (running an APP forming part of a user interface for the hearing aid, denoted 'HA-User interface (APP)' in FIG. 5). The interfaces are illustrated by (broad) arrows between the different parts of the system:

- FS-HA-IF refers to a fitting system→ hearing aid interface (e.g. for transferring model data (e.g. a hearing aid setting) from the simulation model to the hearing aid and (optionally) to the (normal) fitting system of the HCP).
- DL-FS-IF refers to a data logger→ fitting system interface (e.g. for transferring data logged when the user is wearing the hearing aid, e.g. during normal use, to the simulation model and (optionally) to the (normal) fitting system of the HCP). This interface may form part of a bidirectional fitting system<→ hearing aid interface.
- U-HCP-IF refers to a (e.g. bidirectional) user<→ HCP/fitting system interface for exchanging data between the user and the HCP or the fitting system. This communication may (as indicated in FIG. 5) be in an electronic, acoustic, or written form, or a combination thereof
- U-HA-IF refers to a user→ hearing aid interface, e.g. implemented by an APP executed on a handheld processing device (e.g. a smartphone), as indicated in FIG. 5 by the (thin) double arrow between the handheld device (denoted HA-User interface (APP)) and the U-HA-IF-arrow.

In the embodiment of a hearing system shown in FIG. 5, the HCP may act as a validation link between the model and the physical environment (simulation model and hearing aid) to ensure that the proposed settings of the simulation model make sense (e.g. does not cause harm to the user). An embodiment of a hearing system, wherein this 'validation link' is omitted (or automated) is shown in FIG. 6.

Figure 6:
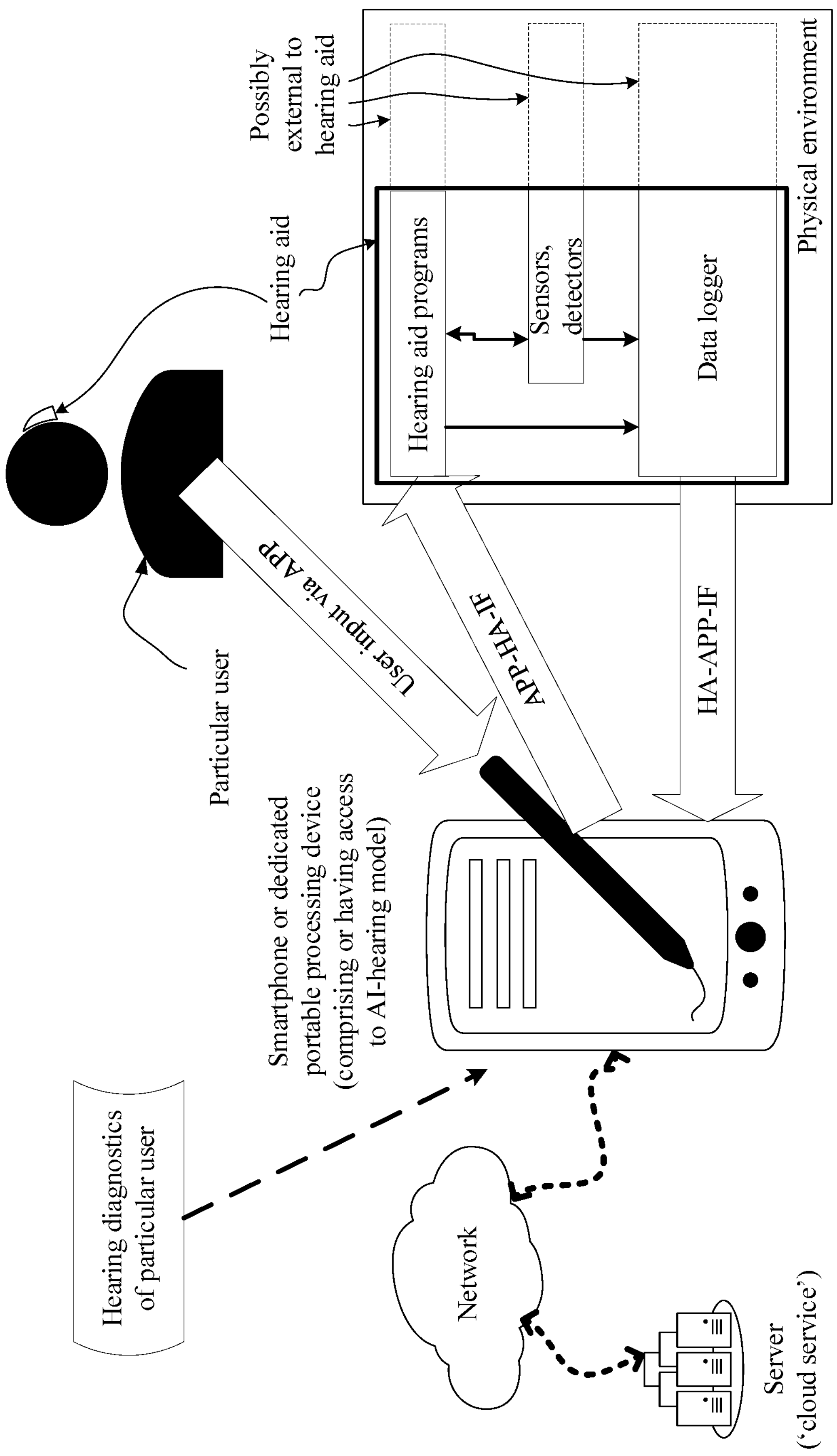
FIG. 6 shows a fourth embodiment of a hearing system according to the present disclosure.

FIG. 6 shows a fourth embodiment of a hearing system according to the present disclosure. The embodiment of a hearing system illustrated in FIG. 6 is based on a partition of the system in a hearing aid and a (e.g. handheld) processing device hosting the simulation model of the hearing aid as well as a user interface for the hearing aid (cf. arrow denoted 'User input via APP'). The handheld processing device is indicated in FIG. 6 as Smartphone or dedicated portable processing device (comprising or having access to AI-hearing model)'. The simulation model and possibly the entire fitting system of the hearing aid may be accessible via an APP on the handheld processing device. Hence the interfaces between the hearing aid and the handheld processing device are denoted APP-HA-IF from the handheld processing device to the hearing aid and HA-APP-IF from the hearing aid to the handheld processing device. The handheld processing device comprises an interface to a network ('Network' in FIG. 6) allow the handheld processing device to access 'cloud services', e.g. located on a server accessible via the network (e.g. the Internet). Thereby, the AI-based simulation model of the hearing aid (which may be computation intensive) may be located on a server. The datalogger may be located fully or partially in the hearing aid, in the handheld processing device or on a network server (as indicated by the dashed outline outside the hearing aid, and the text 'Possibly external to hearing aid'). Likewise, sensors or detectors may be fully or partially located in the hearing aid, in the handheld processing device or constitute separate devices in communication with the hearing system. Likewise, the processing of the hearing aid may be fully or partially located in the hearing aid, or in the handheld processing device.

Thereby, a highly flexible hearing system capable of providing an initial simulation-based hearing aid setting, which can be personalized during use of the hearing aid can be provided. By having access to processing power at different levels, partly in the hearing aid, partly on the handheld or portable processing device, and partly on a network server, the hearing system is capable of utilizing computationally demanding tasks, e.g. involving artificial intelligence, e.g. learning algorithms based on machine learning techniques, e.g. neural networks. Processing tasks may hence be allocated to an appropriate processor taking into account computational intensity AND timing of the outcome of the processing task to provide a resulting output signal to the user with an acceptable quality and latency.

Figure 7A:
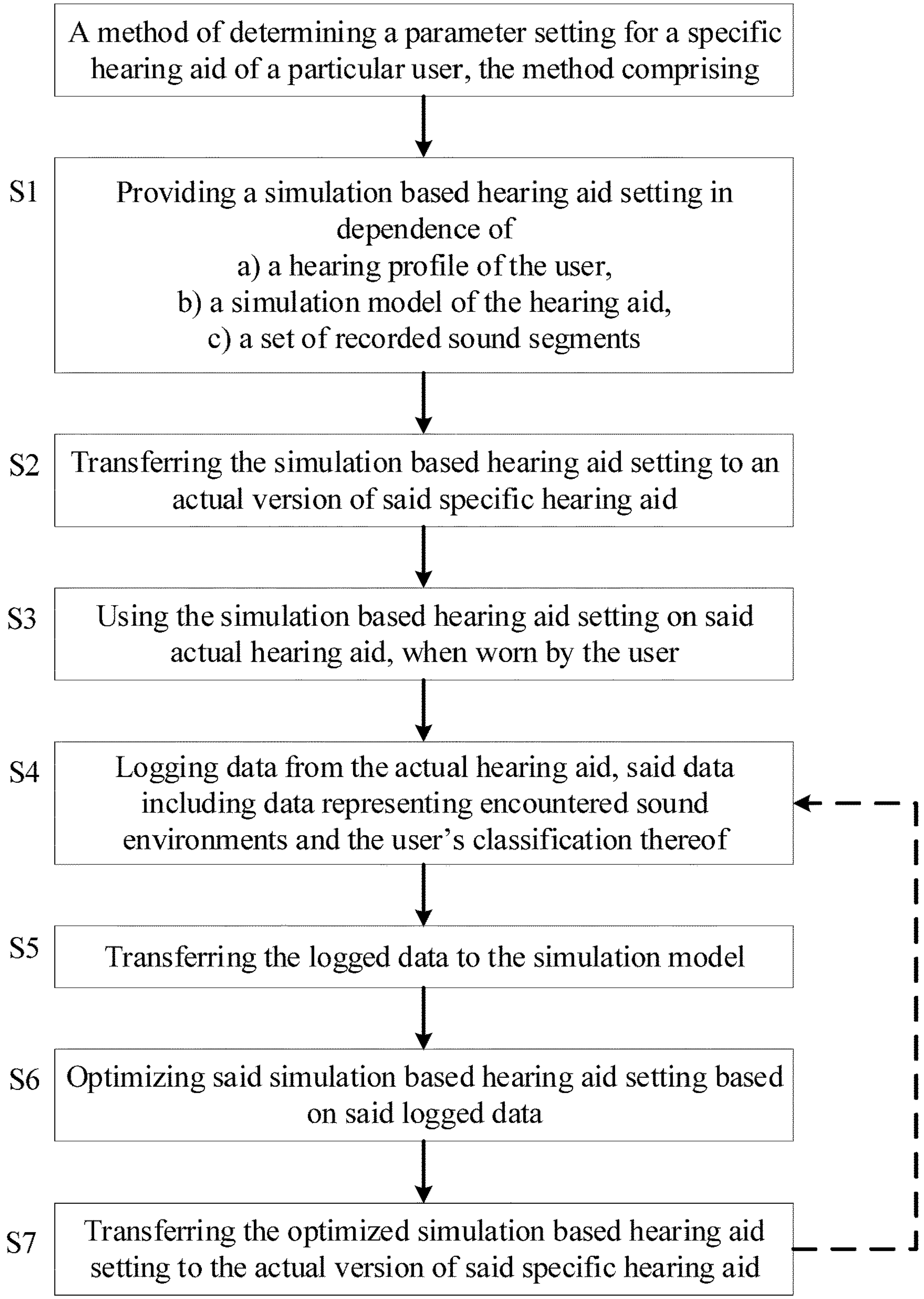
FIG. 7A shows a flow diagram for a first embodiment of a method of determining a parameter setting for a specific hearing aid of a particular user according to the present disclosure.

FIG. 7A shows a flow diagram for an embodiment of a method of determining a parameter setting for a specific hearing aid of a particular user according to the present disclosure.

The method may comprise some or all of the following steps (S1-S7).

The specific hearing aid may e.g. be of a specific style (e.g. a 'receiver in the ear' style having a loudspeaker in the ear canal and a processing part located at or behind pinna, or any other known hearing aid style). The specific hearing aid may be a further specific model of the style that the particular user is going to wear (e.g. exhibiting particular audiological features (e.g. regarding noise reduction/directionality, connectivity, access to sensors, etc.), e.g. according to a specific price segment (e.g. a specific combination of features)).

S1. Providing a simulation-based hearing aid setting in dependence of

- a) a hearing profile of the user,
- b) a (digital) simulation model of the hearing aid, the simulation model comprising configurable processing parameters of the hearing aid,
- c) a set of recorded sound segments (e.g. with known content, or possibly mixed with recorded sound segments experienced by the user).

The hearing profile may e.g. comprise an audiogram (showing a hearing threshold (or hearing loss) versus frequency for the (particular) user. The hearing profile may comprise further data related to the user's hearing ability (e.g. frequency and/or level resolution, etc.). A simulation model of the specific hearing aid may e.g. be configured to allow a computer simulation of the forward path of the hearing aid from an input transducer to an output transducer to be made. The set of recorded sound segments may e.g. comprise recorded and transcribed sentences (e.g. making both audio and text available), and a set of background noises (as audio). Thereby a multitude of electric input signals may be generated by mixing recorded sentences (of known content) with different noise types and levels of noise (relative to the target signal (sentence)). The simulation model may e.g. include an automatic speech recognition algorithm that estimates the content of the (noisy) sentences. Since the contents are known, an estimate of the intelligibility of each (noisy sentence) can be estimated. The simulation model may e.g. allow the simulation-based hearing aid setting to be optimized with respect to speech intelligibility. An optimal hearing aid setting for the particular user may e.g. be determined by optimizing the processing parameters of the simulation model in an iterative procedure in dependence of the recorded sound segments, the hearing profile, the simulation model, and a cost function (see e.g. FIG. 1B).

S2. Transferring the simulation-based hearing aid setting to an actual version of said specific hearing aid.

The simulation model may e.g. run on a specific processing device, e.g. a laptop or tablet computer or a portable device, e.g. a smart phone. The processing device and the actual hearing aid may comprise antenna and transceiver circuitry allowing the establishment of a wireless link between them to provide that an exchange of data between the hearing aid and the processing device can be provided. The simulation-based hearing aid setting may be applied to a processor of the hearing aid and used to process the electric input signal provided by one or more input transducers (e.g. microphones) to provide a processed signal intended for being presented to the user, e.g. via an output transducer of the hearing aid. The actual hearing aid may have a user-interface, e.g. implemented as an APP of a portable processing device, e.g. a smartphone. The user interface may be implemented on the same device as the simulation model. The user interface may be implemented on another device than the simulation model.

S3. Using the simulation-based hearing aid setting on said actual hearing aid, when worn by the user.

The simulation-based hearing aid setting is determined solely based on the hearing profile of the user and model data (e.g. including recorded sound segments). This simulation-based hearing aid setting is intended for use during an initial (learning) period, where data during normal use of the hearing aid, when worn by the particular user for which it is to be personalized, can be captured. Thereby an automized (learning) hearing system may be provided.

S4. Logging data from the actual hearing aid, said data including data representing encountered sound environments and the user's classification thereof.

Figure 7B:
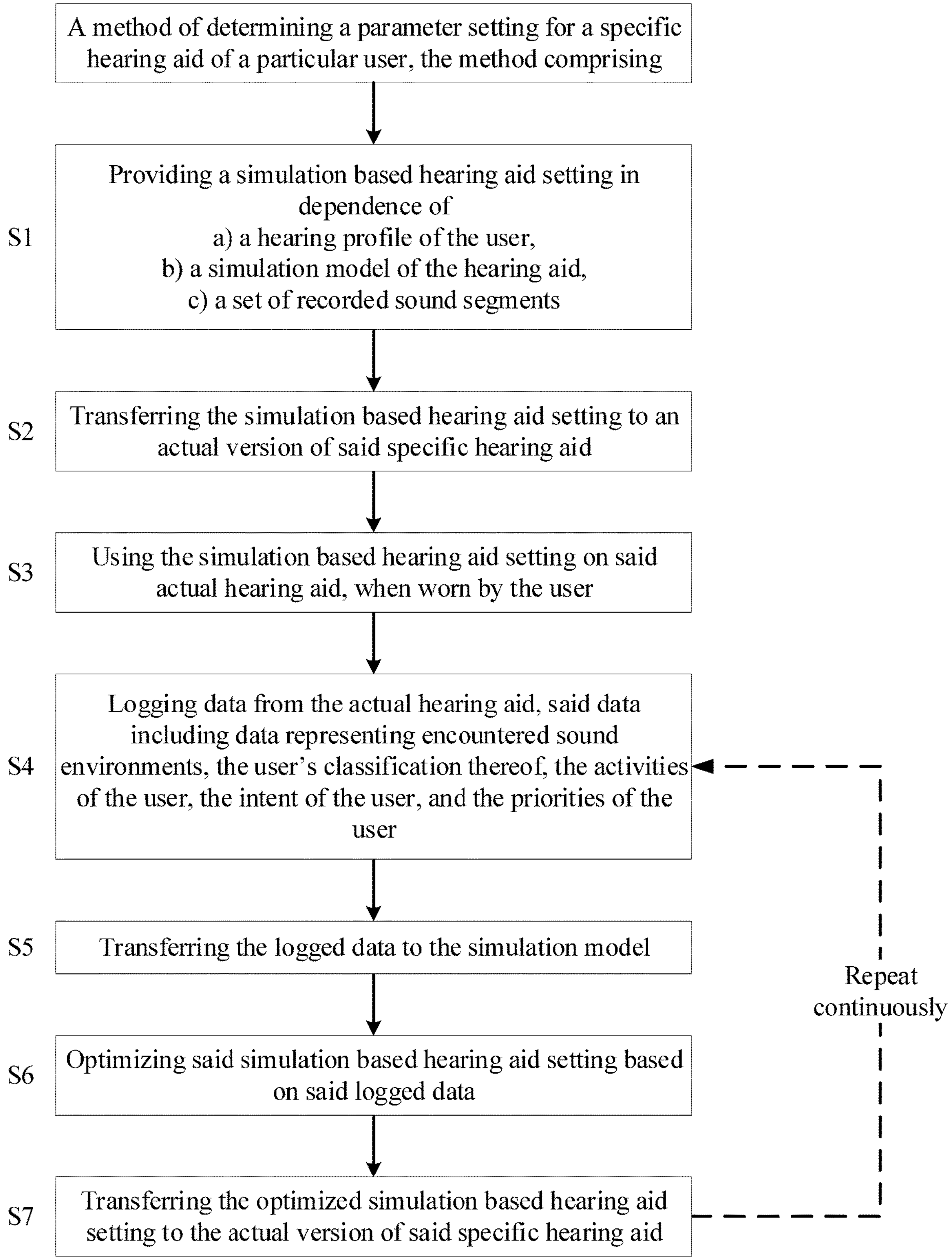
FIG. 7B shows a flow diagram for a second embodiment of a method of determining a continuously optimized parameter setting for a specific hearing aid of a particular user according to the present disclosure.

A user interface, e.g. comprising an APP executed on a portable processing device, may be used as an interface to the hearing aid (and thus to the processing device). Thereby the user's inputs may be captured. Such inputs may e.g. include the user's intent in a given sound environment, and/or a classification of such sound environment. The step S4 may e.g. further comprise logging data from the activities of the user, the intent of the user, and the priorities of the user. The latter feature is shown in FIG. 7B.

S5. Transferring the logged data to the simulation model.

Thereby data from the user's practical use of the hearing aid can be considered by the simulation model (validation).

S6. Optimizing said simulation-based hearing aid setting based on said logged data.

A $2^{nd}$ loop of the learning algorithm is executed using input data from the hearing aid reflecting acoustic environments experienced by the user while wearing the hearing aid (optionally mixed with recorded sound segments with known characteristics, see e.g. step S1), and the user's evaluation of these acoustic environments and/or his or her intent while being exposed to said acoustic environments. Again, an optimal hearing aid setting for the particular user may be determined by optimizing the processing parameters of the simulation model in an iterative procedure in dependence of the user logged and possibly pre-recorded sound segments, the hearing profile, the simulation model, and a cost function, e.g. related to an estimated speech intelligibility (see e.g. FIG. 1B).

S7. Transferring the optimized simulation-based hearing aid setting to the actual version of said specific hearing aid The optimized simulation-based hearing aid setting thus represents a personalized setting of parameters that builds on the initial model data and data extracted from the user's wear of the hearing aid in the acoustic environment that he or she encounters during normal use.

Steps S4-S7 may be repeated, e.g. according to a predefined or adaptively determined scheme, or initiated via a user interface (as indicated by the dashed arrow from step S7 to step S4) or continuously.

FIG. 7B shows a flow diagram for a second embodiment of a method of determining a parameter setting for a specific hearing aid of a particular user according to the present disclosure. FIG. 7B is similar to FIG. 7A apart from step S4 further comprising logging data from the activities of the user, the intent of the user, and the priorities of the user associated with said sound environments. Further, the steps S4-S7 may be repeated continuously to thereby allow the hearing aid setting to be continuously optimized based on sound data, user inputs, etc., logged by the user while wearing the hearing aid.

Figure 8:
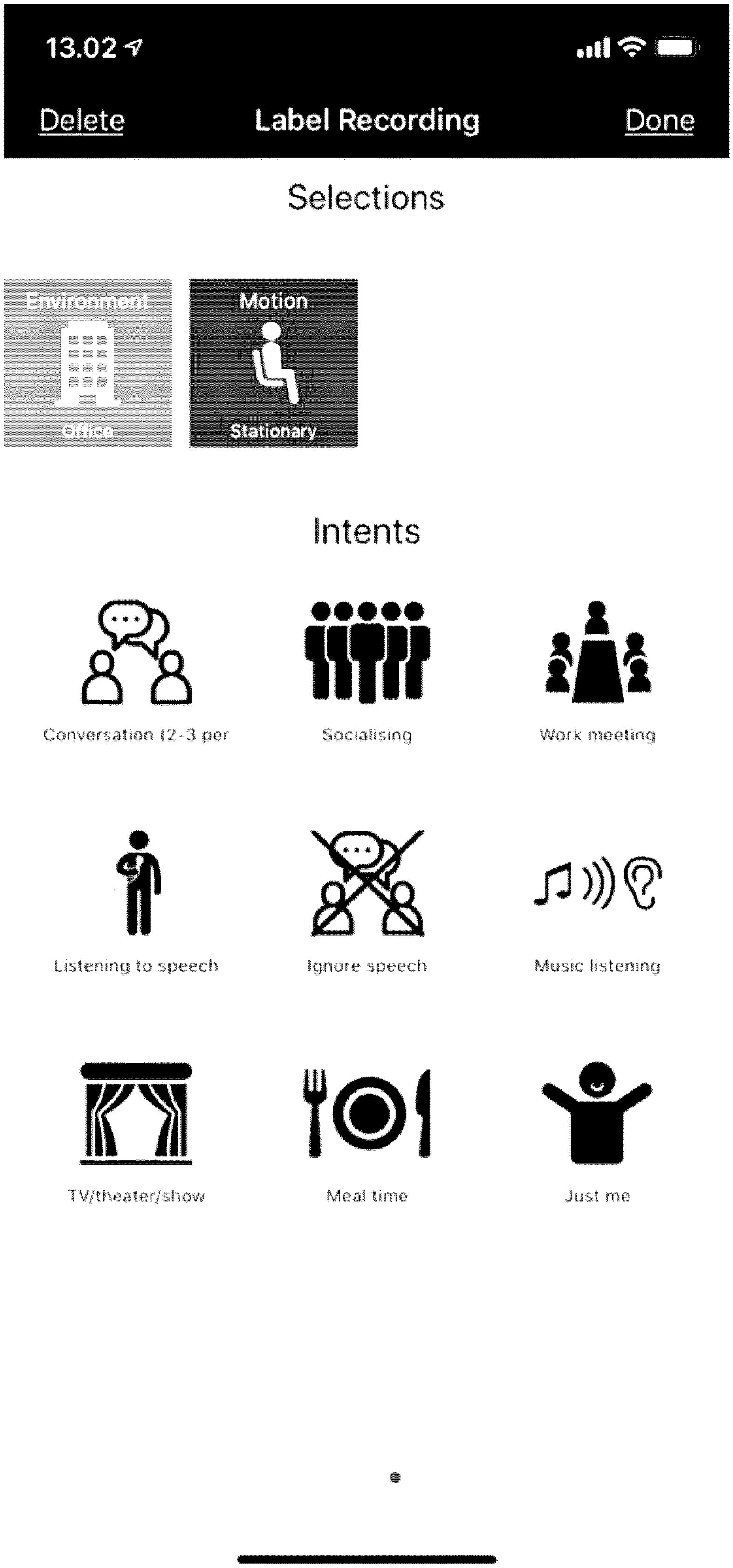
FIG. 8 shows an example of an intent-interface for indicating a user's intent in a current sound environment.

FIG. 8 shows an example of an 'intent interface' for indicating a user's intent in a current sound environment. The 'Intents' selection interface corresponds to a questionnaire allowing a user to indicate a current intent selected among a multitude (here nine) of predefined options, like 'Conversation, 2-3 per', 'Socializing', 'Work meeting', 'Listening to speech', 'Ignore speech', 'Music listening', 'TV/theatre/show', 'Meal time', 'Just me'. The user has the option of selecting one of the (nine) 'Intents' and a current physical environment, here exemplified by 'Environment' vs. 'Office' and 'Motion' vs. 'Stationary'. These data may then be logged together with data representing the current acoustic environment, e.g. a time segment of an electric input signal from a microphone of the hearing aid. The data can then be transferred to the simulation model at appropriate points in time (see arrow 'validation' in FIGS. 1A, 1B and 2B ('Multiscale rating . . . ') and 3 ('Data describing encounter sound environments . . . ') in FIG. 2).

Figure 9:
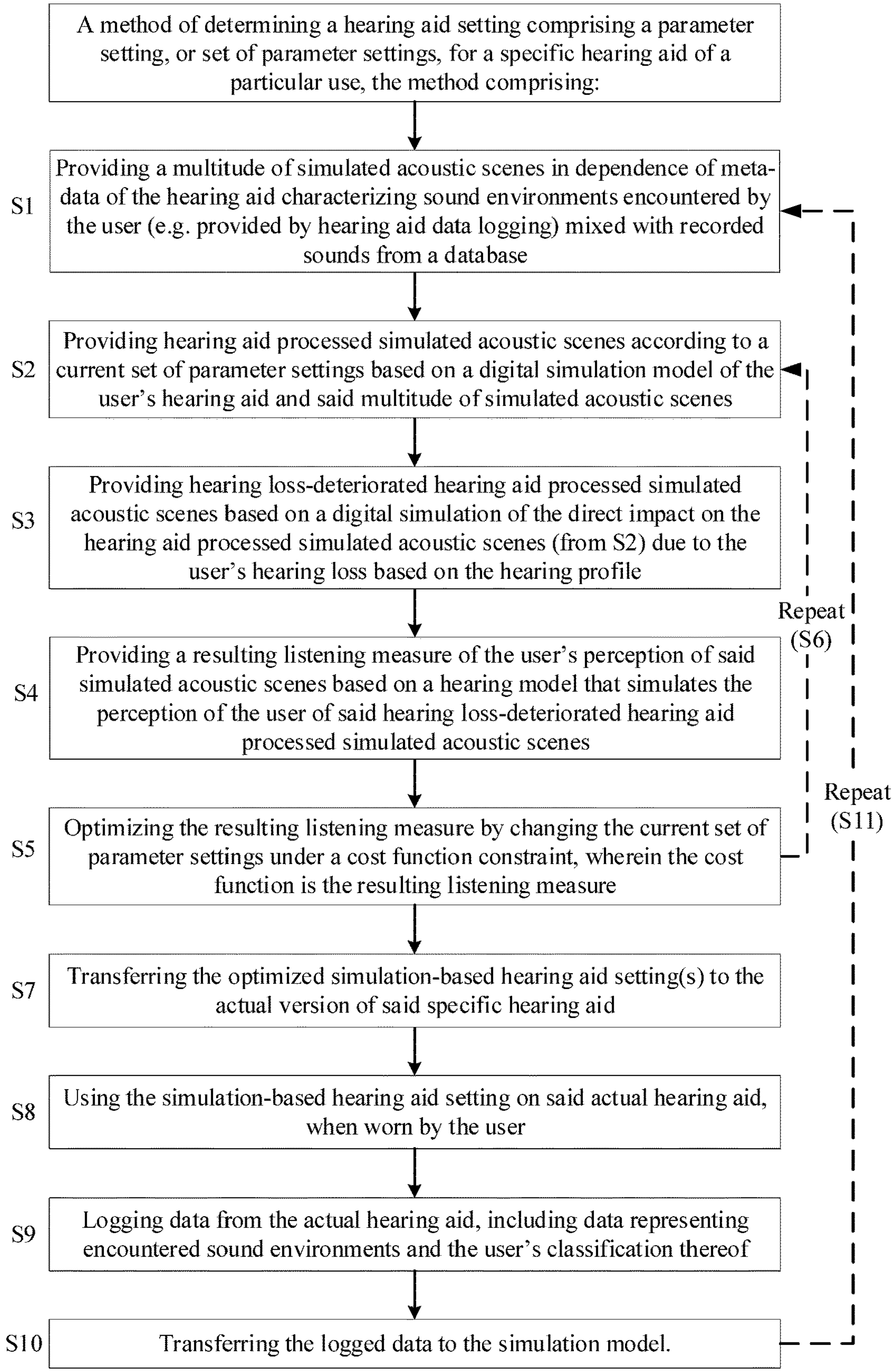
FIG. 9 shows a flow diagram for a third embodiment of a method of determining a continuously optimized parameter setting for a specific hearing aid of a particular user according to the present disclosure.

An Exemplary Method of Determining a Hearing Aid Setting:

FIG. 9 shows a flow diagram for a third embodiment of a method of determining a continuously optimized parameter setting for a specific hearing aid of a particular user according to the present disclosure.

The method is configured to determine a set of parameter settings (setting(s) for brevity in the following) for a specific hearing aid of a particular user covering encountered listening situations. The steps S1-S11 of the method are described in the following:

S1. Meta-data charactering the encountered sound environments and listening situations (from HA data logging) leading to a set of simulated sound environments and listening situations from mixing sounds from a database.

S2. A digital simulation model of the user's own hearing aid that processes the sounds from S1 according to a current set of parameter settings.

S3. A digital simulation of the user's hearing loss based on the hearing profile of the user that simulates the direct impact on the sound due to e.g. deterioration from limited audibility, limited spectral resolution, etc.

S4. An AI-Hearing model that simulates the perception of the impaired hearing, e.g. 1) speech intelligibility based on automatic speech recognizers or metrics like E-STOI, listening effort, comfort based on established metrics.

S5. An optimization of outcomes from S4, e.g. maximization of intelligibility or comfort or sound quality, or minimization of listening effort updating the parameter settings of S2.

S6. Repetition of steps S2-S6 until convergence or set performance is reached (see arrow in FIG. 9, denoted S6).

S7. Transferring the optimized simulation-based hearing aid setting(s) to the actual version of said specific hearing aid.

S8. Using the simulation-based hearing aid setting on said actual hearing aid, when worn by the user.

S9. Logging data from the actual hearing aid, said data including data representing encountered sound environments and the user's classification thereof.

S10. Transferring the logged data to the simulation model.

S11. Optimizing said simulation-based hearing aid setting based on said logged data following S1-S7 (see arrow in FIG. 9, denoted S11).

S1 can be influenced by logging data obtained with same hearing aid or other hearing aid without it having been part of the loop.

The method comprises two loops: An 'inner loop': S2-S6 (denoted S6 in FIG. 9), and an 'outer loop' S1-S11 (denoted S11 in FIG. 9).

The simulation model of the hearing aid (user's or other) is a digital simulation of a hearing aid that processes sound represented in digital format with a set of hearing aid settings. It takes sounds (e.g. provided as meta-data) and current (adaptable) settings as input and outputs sound.

Embodiments of the disclosure may e.g. be useful in applications such as fitting of a hearing aid or hearing aids to a particular user.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Schädler et al.; 2018] Schädler, M. R., Warzybok, A., Ewert, S. D., Kollmeier, B., 2018. Objective Prediction of Hearing Aid Benefit Across Listener Groups Using Machine Learning: Speech Recognition Performance With Binaural Noise Reduction Algorithms. Trends in Hearing, vol. 22, pp. 1-21.

[Schädler et al.; 2016] Schädler, M. R., Warzybok, A., Ewert, S. D., Kollmeier, B., 2016. A simulation framework for auditory discrimination experiments: Revealing the importance of across-frequency processing in speech perception. J. Acoust. Soc. Am. 139, 2708-2723.

[Wöstmann et al.; 2021] Wöstmann, M., Erb, J., Kreitewolf, J., Obleser, J., 2021. Personality captures dissociations of subjective versus objective noise tolerance.

[ANSI S3.5; 1995] American National Standards Institute, "ANSI S3.5, Methods for the Calculation of the Speech Intelligibility Index," New York 1995.

[Jensen & Taal; 2016] J. Jensen and C. H. Taal, "An Algorithm for Predicting the Intelligibility of Speech Masked by Modulated Noise Maskers," IEEE/ACM Transactions on Audio, Speech, and Language Processing, vol. 24, no. 11, pp. 2009-2022, November 2016.

The invention claimed is:

1. A hearing system comprising a processing device, and a hearing aid adapted to be worn by a user, the hearing aid comprising an input transducer configured to provide an electric input signal representing sound in the environment of the user, a hearing aid processor configured to execute at least one processing algorithm configured to modify said electric input signal and providing a processed signal in dependence thereof, said at least one processing algorithm being configurable in dependence of a specific parameter setting, and a user interface allowing a user to control functions of the hearing aid and to indicate user intent related to a preferred processing of a current electric input signal;

a data logger storing time segments of said electric input signal, or estimated parameters that characterizes said electric input signal, and data representing said corresponding user intent while the user is wearing the hearing aid during normal use;

said hearing system comprises a communication interface between said processing device and said hearing aid, the communication interface being configured to allow said processing device and said hearing aid to exchange data between them, the processing device comprising a simulation processor comprising a simulation model of the hearing aid, the simulation model being based on a learning algorithm configured to determine said specific parameter setting for said hearing aid in dependence of a hearing profile of the user, a multitude of time segments of electric input signals representing different sound environments, a plurality of user intentions each being related to one of said multitude of time segments, said user intentions being related to a preferred processing of said time segments of electric input signals, wherein the hearing system is configured to feed said time segments of said electric input signal and data representing corresponding user intent from said data logger, or data representative thereof, to said simulation model via said communication interface to thereby allow said simulation model to optimize said specific parameter setting with data from said hearing aid and said user in an iterative procedure wherein a current parameter setting for said simulation model of said hearing aid is iteratively changed in dependence of a cost function, and wherein said optimized simulation-based hearing aid setting is determined as the parameter setting optimizing said cost function.

2. A hearing system according to claim 1 wherein the processing device forms part of or constitutes a fitting system.

3. A hearing system according to claim 1 wherein the user interface of the hearing aid comprises an APP configured to be executed on a portable electronic device.

4. A hearing system according to claim 1 wherein at least a part of the functionality of the processing device is accessible via a communication network.

5. A hearing system according to claim 1 configured to determine an initial, simulation-based hearing aid setting in dependence of a) the hearing profile of the user, b) the simulation model of the hearing aid, c) a set of recorded sound segments, and to transfer the simulation-based hearing aid setting to said hearing aid via said communication interface, and to apply the simulation-based hearing aid setting to said hearing aid processor for normal use of the hearing aid, at least in an initial learning period.

6. A hearing aid system according to claim 1 wherein the simulation model comprises a model of acoustic scenes.

7. A hearing aid system according to claim 6 wherein the learning algorithm is configured to determine said specific parameter setting for said hearing aid in dependence of a variety of different acoustic scenes created by mixing said time segments of the electric input signals in accordance with said model of acoustic scenes.

8. A hearing aid system according to claim 1 comprising at least one detector or sensor for detecting a current property of the user or of the environment around the user.

9. A hearing aid system according to claim 8 wherein current data from the at least one detector are stored in the datalogger and associated with other current data stored in the data logger.

10. A hearing aid system according to claim 1 wherein the cost function comprises a speech intelligibility measure.

11. A hearing aid system according to claim 1 wherein the hearing aid is constituted by or comprises an air-conduction type hearing aid, a bone-conduction type hearing aid, a cochlear implant type hearing aid, or a combination thereof.

12. A method of determining a parameter setting for a specific hearing aid of a particular user, the method comprising S1Providing a simulation-based hearing aid setting in dependence of a) a hearing profile of the user, b) a digital simulation model of the hearing aid, the simulation model comprising configurable processing parameters of the hearing aid, c) a set of recorded sound segments, d) determining said hearing aid setting by optimizing said processing parameters in an iterative procedure in dependence of said recorded sound segments, said hearing profile, said simulation model, and a cost function, S2Transferring the simulation-based hearing aid setting to an actual version of said specific hearing aid, S3Using the simulation-based hearing aid setting on said actual hearing aid, when worn by the user, S4Logging data from the actual hearing aid, said data including data representing encountered sound environments and the user's classification thereof, S5Transferring the logged data to the simulation model, S6Optimizing said simulation-based hearing aid setting determined in step S1 based on said logged data, optionally mixed with said recorded sound segments, S7Transferring the optimized simulation-based hearing aid setting to the actual version of said specific hearing aid.

13. A method according to claim 12 wherein steps S4-S7 are repeated.

14. A method according to claim 12 wherein step S4 further comprises logging data from one or more of the activities of the user, the intent of the user, and the priorities of the user.

15. A method according to claim 12 wherein the cost function comprises and auditory perception measure.

16. A data processing system comprising a processor and program code means for causing the processor to perform the method of claim 12.

17. A non-transitory computer-readable medium storing computer program comprising instructions which, when the program is executed by a computer, cause the computer to carry out the method of claim 12.

18. A method of determining a hearing aid setting comprising a parameter setting, or set of parameter settings, for a specific hearing aid of a particular user, the method comprising:

S1Providing a multitude of simulated acoustic scenes in dependence of meta-data of the hearing aid characterizing sound environments encountered by the user mixed with recorded sounds from a database;

S2Providing hearing aid processed simulated acoustic scenes according to a current set of parameter settings based on a digital simulation model of the user's hearing aid and said multitude of simulated acoustic scenes from S1;

S3Providing hearing loss-deteriorated hearing aid processed simulated acoustic scenes based on a digital simulation of the direct impact on the hearing aid processed simulated acoustic scenes from S2 due to the user's hearing loss based on the hearing profile;

S4Providing a resulting listening measure of the user's perception of said simulated acoustic scenes based on a hearing model that simulates the perception of the user of said hearing loss-deteriorated hearing aid processed simulated acoustic scenes from S3;

S5Optimizing the resulting listening measure from S4 by changing the current set of parameter settings from S2 under a cost function constraint, wherein the cost function is the resulting listening measure;

S6Repetition of S2-S6 until convergence, or a set performance, is reached;

S7Transferring the optimized simulation-based hearing aid setting(s) to the actual version of said specific hearing aid;

S8Using the simulation-based hearing aid setting on said actual hearing aid, when worn by the user;

S9Logging data from the actual hearing aid, said data including data representing encountered sound environments and the user's classification thereof;

S10Transferring the logged data to the digital simulation model;

S11Optimizing said simulation-based hearing aid setting based on said logged data following steps S1-S7.

19. A method according to claim 18 wherein the resulting listening measure comprises one of a speech intelligibility measure, a listening effort measure, or other comfort based metrics.

20. A method according to claim 18 wherein the cost function constraint comprises maximizing the speech intelligibility measure or a comfort measure, or minimizing the listening effort measure.

* * * * *